(12) United States Patent
Tong et al.

(10) Patent No.: US 6,285,110 B1
(45) Date of Patent: Sep. 4, 2001

(54) SPLINE RETAINING RING

(75) Inventors: Wei Tong, Clifton Park; Christian Lee Vandervort, Voorheesville, both of NY (US)

(73) Assignee: General Electric Co., Schenectady, NY (US)

(*) Notice: Subject to any disclaimer, the term of this patent is extended or adjusted under 35 U.S.C. 154(b) by 0 days.

(21) Appl. No.: 09/551,591

(22) Filed: Apr. 17, 2000

(51) Int. Cl.$^7$ ...................................................... H02K 3/46
(52) U.S. Cl. ............................ 310/270; 310/52; 310/59; 310/261
(58) Field of Search ................................. 310/270, 52, 58, 310/59, 194, 201, 261

(56) References Cited

U.S. PATENT DOCUMENTS

| | | | |
|---|---|---|---|
| 3,324,324 | * 6/1967 | Richardson et al. | 310/214 |
| 4,547,688 | * 10/1985 | Hammer et al. | 310/59 |
| 5,113,114 | * 5/1992 | Shih et al. | 310/270 |
| 5,174,011 | * 12/1992 | Weigelt | 310/270 |
| 5,358,432 | 10/1994 | Shih et al. | 439/825 |
| 5,861,698 | * 1/1999 | Murphy | 310/214 |

FOREIGN PATENT DOCUMENTS

1141021 * 12/1962 (DE) ................................. H02K/3/46

* cited by examiner

*Primary Examiner*—Burton S. Mullins
(74) *Attorney, Agent, or Firm*—Nixon & Vanderhye

(57) ABSTRACT

A retaining ring for a rotor assembly, the retaining ring adapted to constrain field winding end turns arranged in a rotor body, the retaining ring comprising axially inboard and outboard ends and radially inner and outer surfaces, the radially outer surface at the axially inboard end having an aerodynamically smooth spline shape defined by compound radii that merge into a rounded nose portion.

9 Claims, 6 Drawing Sheets

Fig. 2 *(Prior Art)*

SPLINE RETAINING RING

BACKGROUND OF THE INVENTION

This invention relates to retaining rings used to contain centrifugal forces experienced by field winding end turns in a generator.

During normal operation, heat is produced in a generator due to the copper, iron, windage, load or other losses. A ventilation/cooling system is used to remove such generated heat sufficiently to insure the reliable operation of the generator. The objective of the ventilation/cooling system is to achieve relative uniform temperature distribution in the generator with low power consumption. However, due to the complexity of the generator geometry and heat generation, hot spots may exist in certain locations. For air or hydrogen cooled generators, the ventilation flow field at the gap entrance between the generator stator and retaining ring has drawn special attention, since it can result in large ventilating windage loss.

Retaining rings are typically mounted around the end portion of the rotor to enclose the field winding end turns of the generator. In conventional practice, these retaining rings are designed to have a substantially cylindrical shape, with a flat outer profile. This conventional retaining ring design can, however, result in a large pressure drop across the stator-rotor gap entrance and high drag force against the cooling flow, thus leading to a lower generator cooling efficiency. More specifically, conventional retaining rings with flat outer profiles form part of a flow bottleneck at the cooling flow entrance to the gap between the stator core and the rotor. In addition, the interface of the retaining ring nose and the rotor core forms a backward facing step. As cooling gas passes the stator-rotor gap entrance, it generates a large flow recirculation at the retaining ring nose. This results in a large pressure drop at the gap entrance.

BRIEF SUMMARY OF THE INVENTION

The present invention relates to the design of a retaining ring with a spline profile near its nose, to thereby improve the axial cooling flow fluidity and enhance generating cooling capability. By altering the outer profile of the ring, at that end of the ring projecting into the gap between the stator core and rotor, it has been found that approximately 60% of the pressure drop across the stator-rotor gap entrance can be eliminated. As a result, the overall generator efficiency may increase by about 0.01%.

More specifically, by incorporating an aerodynamically smooth spline shape in the radially outer surface of the ring, at the axially inboard portion thereof, in combination with a rounded nose, the effective flow area of the gap is increased while the drag force against the axial cooling flow is decreased. In order to minimize the impact of the spline on the retaining ring strength, the reduction of the retaining ring thickness at its nose is small, and the spline length is only about 17% of the total length of the retaining ring. In the exemplary embodiment, the spline shape is described by a function of a cubic curve where three constants may be adjusted to provide the desired curvature.

Accordingly, in its broader aspects, the present invention relates to a retaining ring for a rotor assembly, the retaining ring adapted to constrain field winding end turns in a rotor body, the retaining ring comprising axially inner and outer ends and radially inner and outer surfaces, the radially outer surface at the axially inboard end having an aerodynamically smooth spline shape defined by compound radii that merge into a rounded nose portion.

In another aspect, the invention relates to a rotor assembly including a rotor body having at least one field winding seated therein with end turns of the field winding extending beyond the rotor body, and an annular retaining ring fixed to the rotor body and adapted to constrain the end turns against centrifugal forces, the retaining ring comprising axially inboard and outboard ends and radially inner and outer surfaces, the radially outer surface at the axially inboard end having an aerodynamically smooth spline shape defined by compound radii that merges into a rounded nose portion.

In still another aspect, the invention relates to a retaining ring for a rotor assembly, the retaining ring adapted to constrain field winding end turns of a plurality of field windings arranged in a rotor body, the retaining ring comprising axially inboard and outboard ends and radially inner and outer surfaces, the radially outer surface at the axially inboard end having an aerodynamically smooth spline shape defined by compound radii that merge into a rounded nose portion; wherein the aerodynamically smooth spline shape extends about 17% of a length dimension of the retaining ring, measured from the rounded nose portion; and wherein the aerodynamically smooth spline shape is described by a function of the cubic curve $$y = \frac{x}{a + bx + cx^2}$$

where a, b, and c are constants; and further wherein a is in a range of less than or equal to 5 and greater than or equal to 0.2; b is in a range of less than or equal to 2.5 and greater than or equal to 1.5; and c is in a range of less than or equal to 0 and greater than or equal to −0.005.

DETAILED DESCRIPTION OF THE INVENTION

Figure 1:
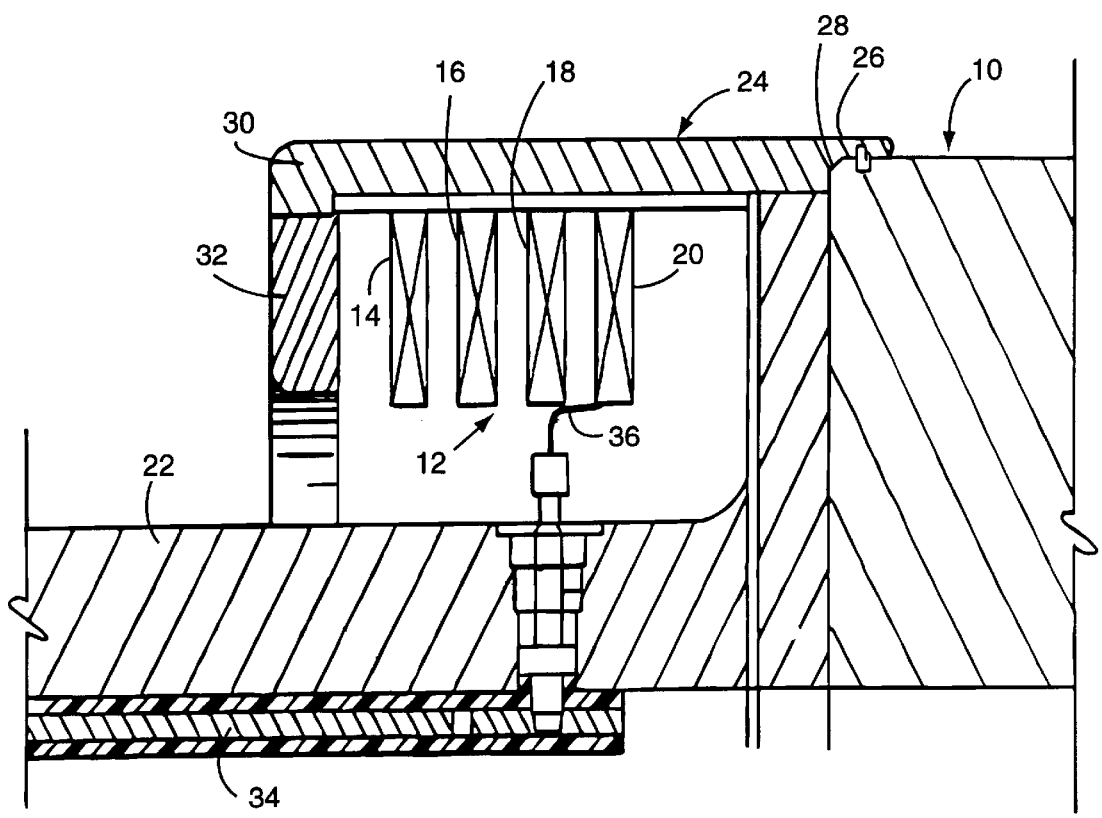
FIG. 1 is a partial side section of a conventional retaining ring on the end of a generator rotor.

With reference to FIG. 1, one end of a rotor body 10 is illustrated with field winding end turns 12 extending beyond the end of the rotor body. The field winding end turns include the ends of a number of complete coils or windings 14, 16, 18 and 20 that are arranged in a concentric, generally rectangular configuration. For a two-pole rotor, two such concentric sets of field coils or windings are arranged on opposite sides of the rotor. The invention is applicable, however, to other rotor configurations as well. Each coil or winding includes many layers of copper conductors in a stacked configuration. The invention can be applied to windings made up of multiple layers of discrete conductors, as well as single wound conductors. The coils are nested within axially extending radial slots (not shown) machined into the outer periphery of the rotor body, with the end turns extending axially beyond a radial edge of the rotor body at both ends of the machine in conventional fashion. A spindle portion 22 of the rotor extends in an axial direction but radially inward of the end turns. The coils 14, 16, 18 and 20 are supported in the slots of the rotor body against centrifugal forces by metallic wedges (not shown) which bear against machined dovetail surfaces (not shown) in each rotor coil slot.

The end turns are supported against centrifugal forces by a high strength, annular steel retaining rings 24 (one shown). The inboard end 26 of each retaining ring is shrunk onto a machined surface of the rotor body, while the outboard end 30 of the retaining ring 24 is shrunk onto a circular shaped steel member or centering ring 32. The field winding is electrically insulated from the rotor body and retaining ring via appropriate ground insulation (not shown). Electrical connection with a copper bore conductor 34 is made via connector 36.

Figure 2:
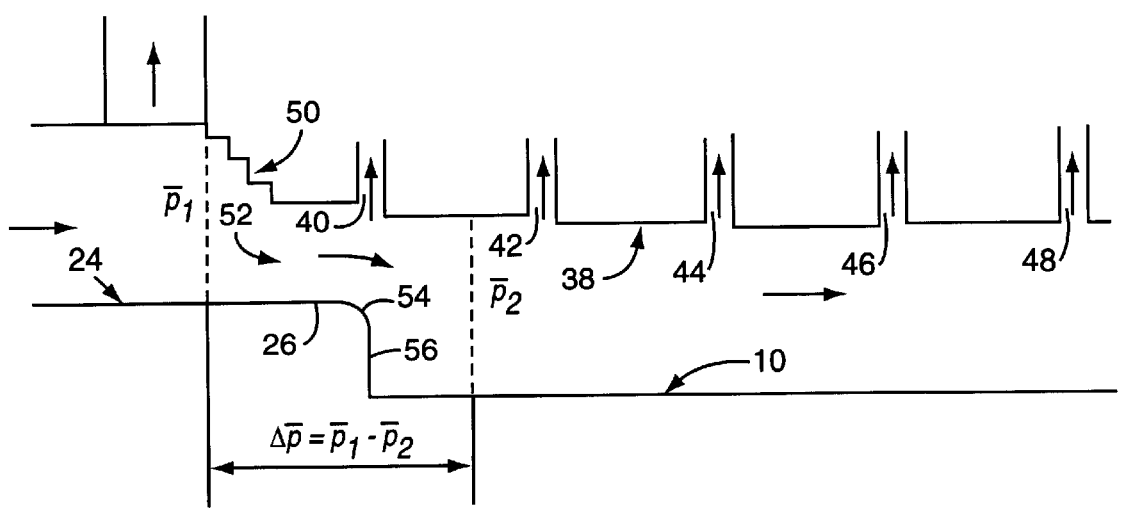
FIG. 2 illustrates in schematic form, a cooling flow path and pressure drop near the stator-rotor gap entrance.

With reference now to FIG. 2, a schematic diagram illustrates a flow path between the rotor and stator, and particularly at the rearward or inboard end 26 of the retaining ring 24 shown in FIG. 1. Here, it may be seen that a radial step is formed between the retaining ring 24 and rotor 10 on the one hand, and a radial gap between the rotor 10 and the stator core assembly 38 on the other. Cooling flow generated by a fan (not shown) at the end of the rotor 10 is illustrated by the flow arrows, and radial flow passages may be seen extending into the stator core at various cooling flow inlets 40, 42, 44, 46, 48. It can be seen that a bottleneck is formed between the inboard end 26 of the retaining ring and the end taper 50 of the stator core assembly 38 at the stator-rotor gap entrance 52. At the same time, the retaining ring nose 54 and the rotor 10 form a backward facing radial step 56. It will be appreciated that as cooling gas passes the stator-rotor entrance gap 52, it generates a large flow circulation at the retaining ring nose and, consequently, produces a large pressure drop. This pressure drop may be defined as $\Delta \bar{p} = \bar{p}_1 - \bar{p}_2$, where $\bar{p}_1$ is the pressure upstream of the core end taper 50, and $\bar{p}_2$ is the pressure downstream of the radial step 56.

Figure 3:
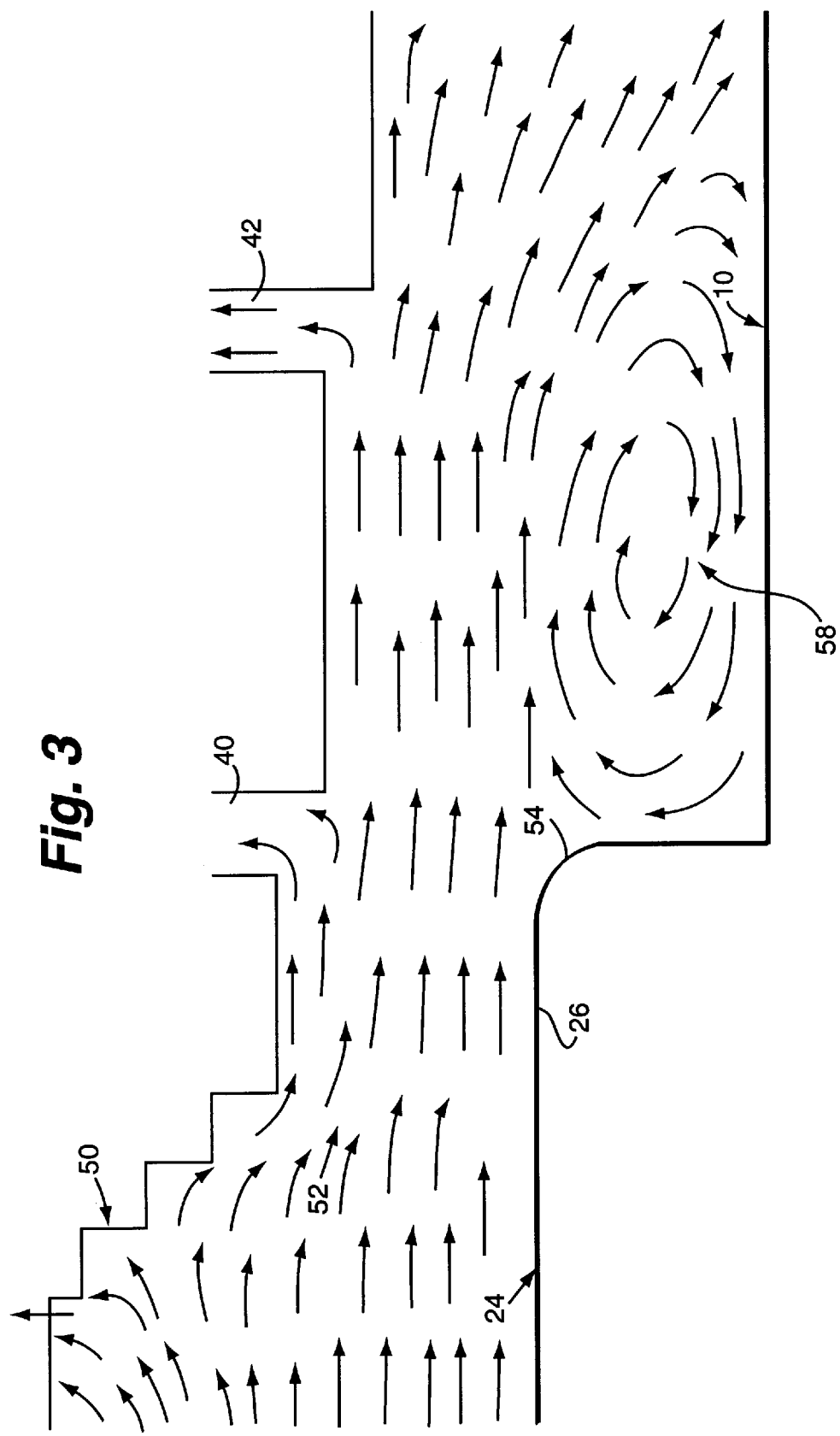
FIG. 3 is a velocity vector diagram illustrating velocity factors at a portion of the flow path shown in FIG. 2.

FIG. 3 is a velocity vector diagram which illustrates the large flow circulation 58 adjacent the radial step 56. This circulation produces a large drag force against the axial ventilating flow.

Figure 4:
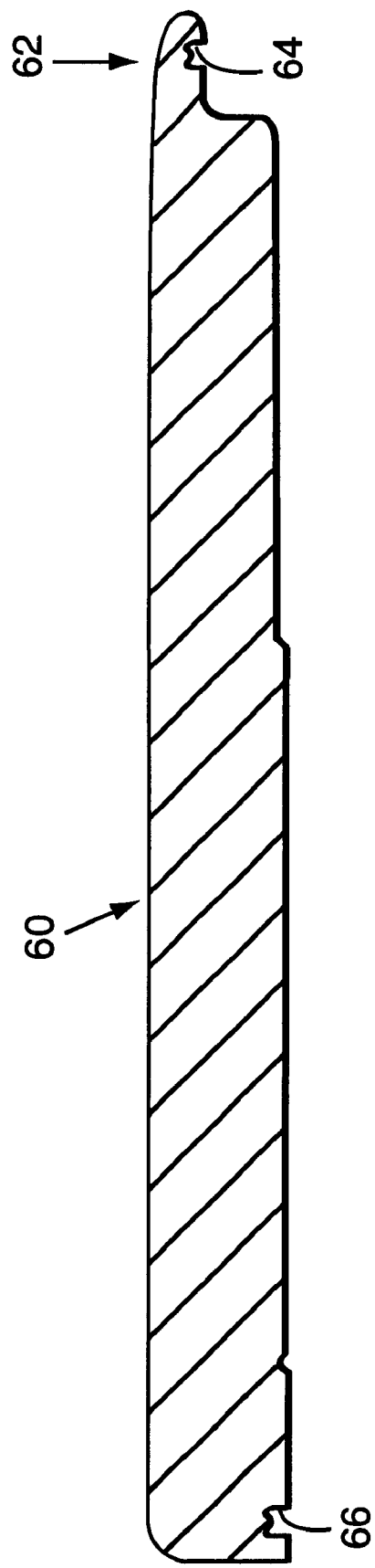
FIG. 4 is a side section illustrating a retaining ring in accordance with an exemplary embodiment of this invention.

Turning to FIG. 4, a redesigned retaining ring 60 in accordance with an exemplary embodiment of the invention is illustrated. The retaining ring is substantially cylindrical in shape, but the outer surface has been modified as described below. The structural features of the retaining ring are the same as in a conventional retaining ring in the axially outboard end 61 of the ring, as well as along the radially inner surface 64 incorporating the locking key grooves 66, 68. The retaining ring 60 in accordance with this invention, has a modified outer surface or profile 70 at the axially inboard end portion 62. In other words, the radially outer profile is altered from a flat, cylindrical surface to an aerodynamically curved spline surface, with the curvature extending only about 17% of the total retaining ring length, as measured from the rounded nose 72 that terminates in the radial step 74 (see FIG. 5). The curvature is defined by compound radii, designed to provide an aerodynamically smooth surface. More specifically, the spline shape of the outer surface 70 of the retaining ring in the axially inboard portion 62 can be described by a function of the cubic curve $$y = \frac{x}{a + bx + cx^2}$$

where a, b, and c are constants. Basically, a determines the spline shape, b defines the maximum retaining ring outer diameter which the spline curve approaches, and c has a strong impact on the spline curve slope, i.e., how fast the spline curve approaches the retaining ring outer diameter. The general ranges of the constants are:

$0.2 \leq a \leq 5.0$ $1.5 \leq b \leq 2.5$ $-0.005 \leq c \leq 0$

Figure 6:
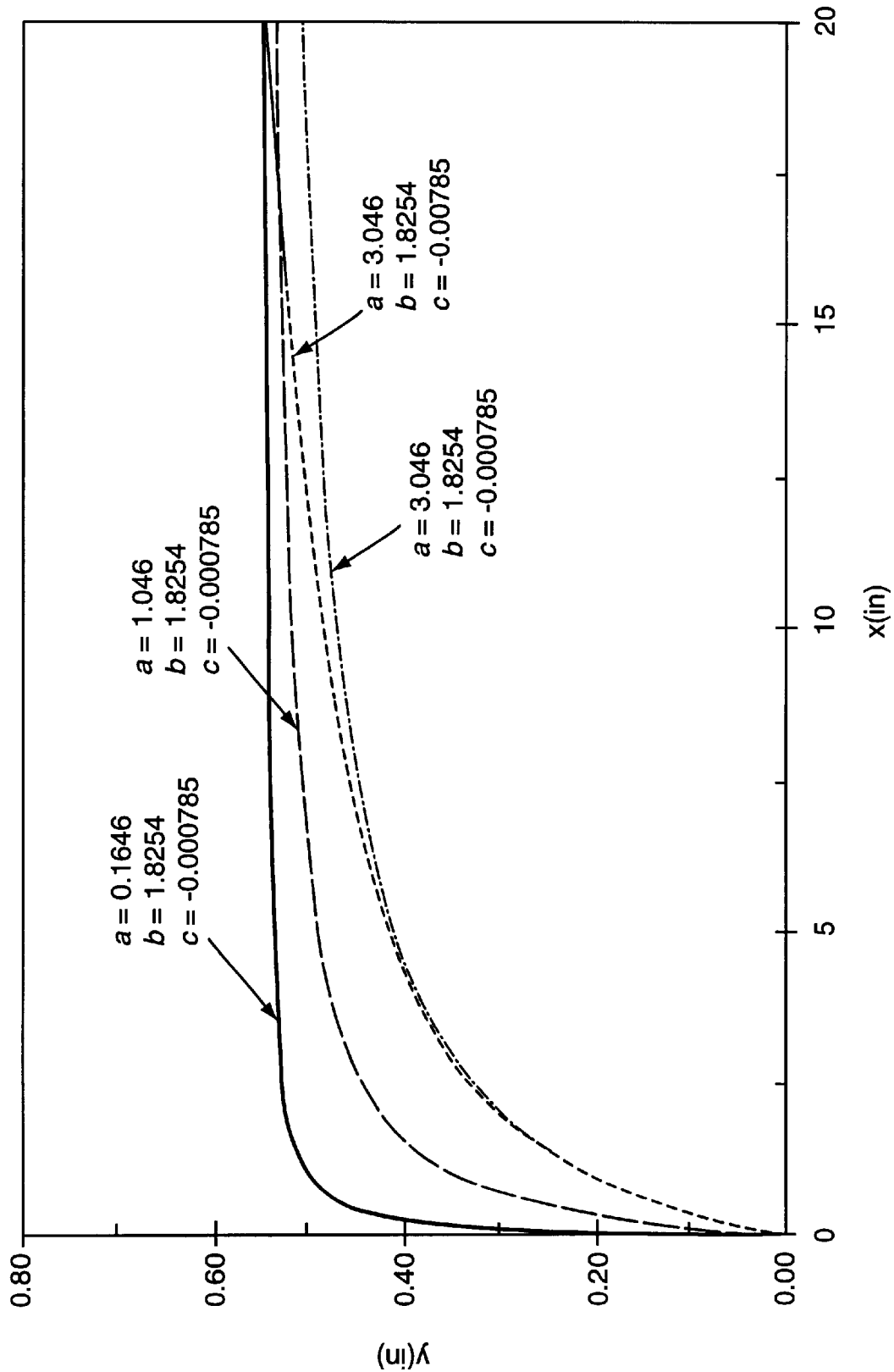
FIG. 6. is a plot of dimensions for various spline profiles in accordance with the invention.

Examples for defining spline profiles are presented in FIG. 6. For a specific generator, b is essentially fixed. It has been demonstrated in the figure that by keeping b and c fixed, the spline shape changes significantly with the a value. It also shows that the spline slope is inversely proportional to the c value. As c decreases, the curve slope becomes higher, indicating that the ratio of the spline length to the total retaining ring length becomes larger. The optimizing spline profile can be determined by trading off these three constants so that the design requirements can be best satisfied.

Figure 5:
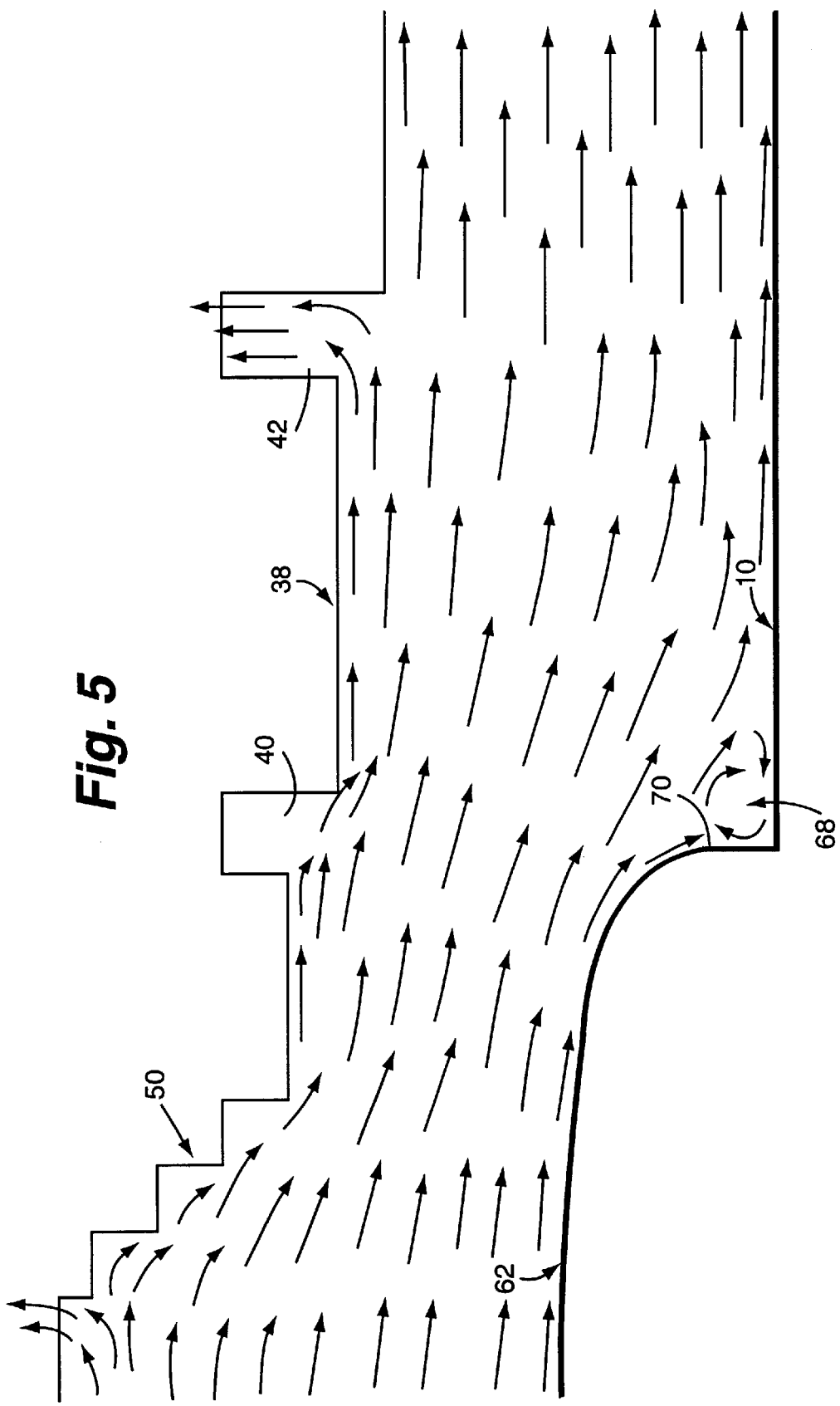
FIG. 5 is a velocity vector diagram, illustrating velocity vectors that the rotor/stator gap entrance, utilizing a spline retaining ring as illustrated in FIG. 3.

It has been found that by so modifying the outer surface of the retaining ring at the stator-rotor gap entrance, axial cooling flow fluidity is improved and the generator cooling capability is enhanced. The improved flow is shown in FIG. 5 where a velocity vector diagram similar to FIG. 3 is shown, but with the redesigned inboard end portion 62 of the retaining ring 60. It can be appreciated that the flow circulation at 76, adjacent the radial step 74 (radially inward of the nose 61) has been substantially reduced as compared to the conventional design. In fact, approximately 60% of the pressure drop across the stator-rotor gap entrance can be eliminated, resulting in a generator efficiency increase of about 0.01%. The present invention thus produces the following advantages: (1) a reduction in pressure drop across the stator-rotor gap entrance; (2) a reduction in drag force against the axial cooling flow at the stator-rotor gap entrance; (3) an increase in generator cooling capability and temperature uniformity; and (4) improved cooling flow fluidity at the rotor-stator gap entrance.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A retaining ring for a rotor assembly, said retaining ring adapted to constrain field winding end turns arranged in a rotor body, said retaining ring comprising axially spaced inboard and outboard ends and radially inner and outer surfaces, said radially outer surface at said inboard end having an aerodynamically smooth spline-shaped curve defined by compound radii extending from a flat cylindrical surface axially along said inboard end and merging into a rounded nose portion.

2. A retaining ring for a rotor assembly, said retaining ring adapted to constrain field winding end turns arranged in a rotor body, said retaining ring comprising axially inboard and outboard ends and radially inner and outer surfaces, said radially outer surface at said axially inboard end having an aerodynamically smooth spline shape defined by compound radii that merge into a rounded nose portion; wherein said aerodynamically smooth spline shape extends about 17% of a length dimension of said retaining ring, measured from said rounded nose portion.

3. A retaining ring for a rotor assembly, said retaining ring adapted to constrain field winding end turns arranged in a rotor body, said retaining ring comprising axially inboard and outboard ends and radially inner and outer surfaces, said radially outer surface at said axially inboard end having an aerodynamically smooth spline shape defined by compound radii that merge into a rounded nose portion; wherein said aerodynamically smooth spline shape is described by a function of the cubic curve $$y = \frac{x}{a + bx + cx^2}$$

where a, b, and c are constants.

4. The retaining ring of claim 3 wherein a is in a range of less than or equal to 5 and greater than or equal to 0.2 and b is in a range of less than or equal to 2.5 and greater than or equal to 1.5; and c in in a range of less than or equal to 0 and greater than or equal to −0.005.

5. A rotor assembly including a rotor body having at least one field winding seated therein with end turns of said field winding extending beyond said rotor body and an annular retaining ring fixed to the rotor body and adapted to constrain said end turns against centrifugal forces, said retaining ring comprising axially spaced inboard and outboard ends and radially inner and outer surfaces, said radially outer surface at said inboard end having an aerodynamically smooth spline-shaped curve defined by compound radii extending from a flat cylindrical surface axially along said inboard end and merging into a rounded nose portion.

6. A rotor assembly including a rotor body having at least one field winding seated therein with end turns of said field winding extending beyond said rotor body and an annular retaining ring fixed to the rotor body and adapted to constrain said end turns against centrifugal forces, said retaining ring comprising axially inboard and outboard ends and radially inner and outer surfaces, said radially outer surface at said axially inboard end having an aerodynamically smooth spline shape defined by compound radii that merges into a rounded nose portion; wherein said aerodynamically smooth spline shape is described by a function of the cubic curve $$y = \frac{x}{a + bx + cx^2}$$

where a, b, and c are constants.

7. The retaining ring of claim 6 wherein a is in a range of less than or equal to 5 and greater than or equal to 0.2; b is in a range of less than or equal to 2.5 and greater than or equal to 1.5; and c is in a range of less than or equal to 0 and greater than or equal to −0.005.

8. A rotor assembly including a rotor body having at least one field winding seated therein with end turns of said field winding extending beyond said rotor body and an annular retaining ring fixed to the rotor body and adapted to constrain said end turns against centrifugal forces, said retaining ring comprising axially inboard and outboard ends and radially inner and outer surfaces, said radially outer surface at said axially inboard end having an aerodynamically smooth spline shape defined by compound radii that merges into a rounded nose portion; wherein said aerodynamically smooth spline shape extends about 17% of a length dimension of said retaining ring, measured from said rounded nose portion.

9. A retaining ring for a rotor assembly, said retaining ring adapted to constrain field winding end turns of a plurality of field windings arranged in a rotor body, said retaining ring comprising axially inboard and outboard ends and radially inner and outer surfaces, said radially outer surface at said axially inboard end having an aerodynamically smooth spline shape defined by compound radii that merge into a rounded nose portion; wherein said aerodynamically smooth spline shape extends about 17% of a length dimension of said retaining ring, measured from said rounded nose portion; and wherein said aerodynamically smooth spline shape is described by a function of the cubic curve $$y = \frac{x}{a + bx + cx^2}$$

where a, b, and c are constants; and further wherein a is in a range of less than or equal to 5 and greater than or equal to 0.2; b is in a range of less than or equal to 2.5 and greater than or equal to 1.5; and c is in a range of less than or equal to 0 and greater than or equal to −0.005.

* * * * *